United States Patent [19]

Sugio et al.

[11] Patent Number: 4,663,376
[45] Date of Patent: May 5, 1987

[54] POLYPHENYLENE ETHER RESIN COMPOSITION

[75] Inventors: Akitoshi Sugio, Ohmiya; Masao Okabe, Abiko; Toshihiko Kobayashi, Showa, all of Japan

[73] Assignee: Mitsubishi Gas Chemical Company, Inc., Tokyo, Japan

[21] Appl. No.: 776,029

[22] Filed: Sep. 13, 1985

[30] Foreign Application Priority Data

Sep. 14, 1984 [JP]  Japan ................................ 59-193482

[51] Int. Cl.$^4$ ................................................ C08K 5/29
[52] U.S. Cl. ..................................................... 524/195
[58] Field of Search .......................... 524/195; 560/35

[56] References Cited

U.S. PATENT DOCUMENTS

| 1,818,942 | 8/1931 | Clifford | 524/195 |
| 2,687,962 | 8/1954 | Chenicek | 524/195 |
| 4,021,471 | 5/1977 | Virgilio et al. | 560/35 |
| 4,085,062 | 4/1978 | Virgilio et al. | 560/35 |

FOREIGN PATENT DOCUMENTS 45-574  1/1970  Japan .
7504572 10/1975  Netherlands .

Primary Examiner—Veronica P. Hoke
Attorney, Agent, or Firm—Wenderoth, Lind & Ponack

[57] ABSTRACT

A polyphenylene ether resin composition comprising
(A) a polyphenylene ether resin,
(B) a vinyl aromatic resin, and
(C) a phenylformamidine derivative in a heat stabilizing amount.

5 Claims, No Drawings

POLYPHENYLENE ETHER RESIN COMPOSITION

This invention relates to a polyphenylene ether resin composition, and more specifically, to a polyphenylene ether resin composition having superior heat stability.

Polyphenylene ether resins are known and disclosed in the known literature, for example in U.S. Pat. Nos. 3,306,874, 3,306,875, 3,257,357, 3,257,358 and 4,011,200, and Japanese Laid-Open Patent Publication No. 126800/1975. Polyphenylene ether resins having a molecular weight higher than a certain point have a high softening point, and are therefore useful in applications requiring heat resistance. However, because of their high softening points, the production of resin compositions containing such polyphenylene ether resins requires higher temperatures for kneading and extrusion than in the case of using other general-purpose resins. Moreover, the resulting resin compositions have to be molded at high temperatures. As is well known, the polyphenylene ether resins are comparatively unstable to heat, and extrusion and molding at high temperatures and long-term use at high temperatures degrade these resins, and will become a cause of degraded properties of a resin composition containing the polyphenylene ether. Such degradation in properties limits extensive use of the resin composition containing the polyphenylene ether, and it has been desired to remedy these defects.

Various methods have already been proposed for the stabilization of resin compositions containing polyphenylene ethers. Specifically, such stabilization has been attempted by capping the hydroxyl group present at the terminal position of the polyphenylene ether molecules by acylation, etc., or by adding various stabilizers.

Stabilizers which are effective for stabilizing polyphenylene ethers include, for example, benzoates (see U.S. Pat. No. 3,379,875), hexaalkylphosphoric triamides or combinations thereof with other compounds (U.S. Pat. Nos. 3,414,536, 3,420,792, 3,429,850, 3,465,062, 3,472,814, 3,483,271, 3,792,121 and 3,816,562), octaalkylpyrophosphoramides or combinations thereof with other compounds (see U.S. Pat. No. 3,450,670), amines (see U.S. Pat. Nos. 3,563,934 and 3,956,423), phosphites and hydrazines (see U.S. Pat. No. 3,639,334), alkanolamines (see U.S. Pat. No. 3,761,541), arylphosphonic diamides (see U.S. Pat. No. 3,792,120), sterically hindered phenols having a triazine or isocyanuric ring (see U.S. Pat. No. 4,154,719), substituted dicarboxylic acid dihydrazides (see U.S. Pat. No. 3,954,904), high-molecular-weight phosphites or combinations thereof with other compounds (see U.S. Pat. No. 3,952,072), amides (see Japanese Patent Publication No. 29748/1969), metal salts of dithiocarbamic acid (see Japanese Patent Publications Nos. 19395/1970 and 8352/1970), carboxylic acid anhydrides (see Japanese Patent Publication No. 29750/1969), phosphites (see Japanese Patent Publication No. 29751/1969), sterically hindered phenols or combinations thereof with other compounds (see Japanese Patent Publications Nos. 43473/1971, 42029/1971, 42030/1971, 42031/1971, 42032/1971 and 42033/1971), sterically hindered phenols having one amide bond in the molecules (see Japanese Patent Publication No. 24782/1971), sterically hindered phenols having one ester linkage in the molecule (see Japanese Patent Publication No. 38623/1973), high-molecular-weight phosphites (Japanese Laid-Open Patent Publications Nos. 23846/1974, 31755/1974 and 40476/1975), and combinations of phosphorous acid amides with boron compounds (see Japanese Laid-Open Patent Publication No. 129750/1974).

It is an object of this invention to provide a novel polyphenylene ether resin composition having heat stability.

Other objects of this invention along with its advantages will become apparent from the following description.

According to this invention, these objects and advantages are achieved by a polyphenylene ether resin composition comprising (A) a polyphenylene ether resin, (B) a vinyl aromatic resin and (C) a phenylformamidine derivative.

The polyphenylene ether resin (A) constituting the resin composition of this invention denotes a homo- or co-polymer of phenylene ether, and a grafted polyphenylene ether polymer obtained by grafting an aromatic vinyl compound to such homo- or co-polymer.

Preferably, the homopolymer or copolymer of polyphenylene ether is obtained by polycondensing a monocyclic phenol represented by the following formula

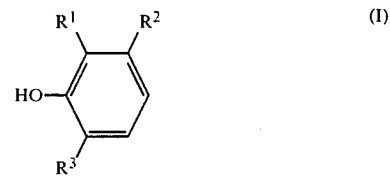

wherein $R^1$ represents a lower alkyl group having 1 to 3 carbon atoms, and $R^2$ and $R^3$, independently from each other, represent a hydrogen atom or an alkyl group having 1 to 3 carbon atoms.

The homopolymer can be obtained from a single monocyclic phenol, and the copolymer, from two or more monocyclic phenols.

The alkyl group having 1 to 3 carbon atoms in general formula (I) denotes methyl, ethyl, n-propyl and iso-propyl groups.

Examples of the monocyclic phenol of general formula (I) include 2,6-dimethylphenol, 2,6-diethylphenol, 2,6-dipropylphenol, 2-methyl-6-ethylphenol, 2-methyl-6-propylphenol, 2-ethyl-6-propylphenol, o-cresol, 2,3-dimethylphenol, 2,3-diethylphenol, 2,3-dipropylphenol, 2-methyl-3-ethylphenol, 2-methyl-3-propylphenol, 2-ethyl-3-methylphenol, 2-ethyl-3-propylphenol, 2-propyl-3-methylphenol, 2-propyl-3-ethylphenol, 2,3,6-trimethylphenol, 2,3,6-triethylphenol, 2,3,6-tripropylphenol, 2,6-dimethyl-3-ethylphenol and 2,6-dimethyl-3-propylphenol. Accordingly, examples of polyphenylene ether resins obtained by polycondensing these monocyclic phenols include homopolymers such as poly(2,6-diemthyl-1,4-phenylene)ether, poly(2,6-diethyl-1,4-phenylene)ether, poly(2,6-dipropyl-1,4-phenylene)ether, poly(2-methyl-6-ethyl-1,4-phenylene)ether, poly(2-methyl-6-propyl-1,4-phenylene)ether and poly(2-ethyl-6-propyl-1,4-phenylene)ether, and copolymers such as 2,6-dimethylphenol/2,3,6-trimethylphenol copolymer, 2,6-dimethylphenol/2,3,6-triethylphenol copolymer, 2,6-diethylphenol/2,3,6-trimethylphenol copolymer and 2,6-dipropylphenol/2,3,6-trimethylphenol copolymer.

Of these, poly(2,6-dimethyl-1,4-phenylene)ether and 2,6-dimethylphenol/2,3,6-trimethylphenol copolymer are preferred.

Preferred as the aforesaid grafted polymer is a graft polymer obtained by grafting an aromatic vinyl compound represented by the following formula (II)

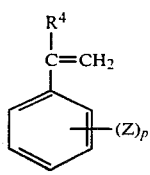

wherein $R^4$ represents a hydrogen atom or a lower alkyl group, Z represents a halogen atom or a lower alkyl group, and p is 0 or an integer of 1 to 3, to the polyphenylene ether homo- or co-polymer. The grafted polymer can be produced, for example, by the method described in Japanese Laid-Open Patent Publication No. 126,800/1975. Examples of the aromatic vinyl compound are styrene, alpha-methylstyrene, vinyltoluene, vinylxylene, ethyl styrene, n-propylstyrene, iso-propylstyrene, chlorostyrene and bromostyrene.

Especially preferred grafted polymers are a graft polymer obtained by grafting styrene to poly(2,6-dimethyl-1,4-phenylene)ether and a graft polymer obtained by grafting styrene to 2,6-dimethylphenol/2,3,6-trimethylphenol copolymer.

The vinyl aromatic resin (B) is preferably one containing at least 25% by weight of structural units of the following formula (III)

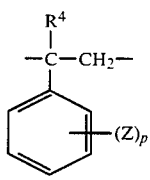

wherein $R^4$, z and p are as defined with regard to formula (II).

The lower alkyl group for $R^4$ and Z in formula (III) is preferably an alkyl group having 1 to 3 carbon atoms, such as methyl, ethyl, n-propyl and iso-propyl.

The halogen atom for Z in formula (III) is preferably chlorine or bromine.

The structural units of formula (III) are derived from a styrene monomer of the above formula (II).

Examples of preferred polystyrene resins are polystyrene, polychlorostyrene, high-impact polystyrene (rubber-modified polystyrene), poly(p-methylstyrene), rubber-modified poly(p-methylstyrene), styrene/butadiene copolymer, styrene/butadiene/acrylonitrile copolymer, styrene/acrylic acid rubber/acrylonitrile copolymer, styrene/alpha-methylstyrene copolymer and styrene/butadiene resinous block copolymer.

Among these, high impact polystyrene is especially preferred. The high-impact polystyrene includes rubber-modified polystyrene resins obtained by modifying polystyrene with elastomers such as polybutadiene, butadienestyrene copolymer rubber or EPDM. The rubber-modified polystyrene denotes a resin having an elastomer phase in the form of particles dispersed in a matrix of polystyrene. Such a resin can be formed by mechanically mixing polystyrene with an elastomer, or by copolymerizing an elastomer with a styrene-type monomer. Resins obtained by the latter method are preferably used in this invention. Industrially, the rubber-modified polystyrene resin is produced by graft polymerizing a styrene-type monomer in the presence of an elastomer.

The polystyrene resin (B) may be one of the above-exemplified resins, or a mixture of two or more of them.

The phenylformamidine derivative (C) used in the resin composition of this invention is a compound represented by the following general formula (IV).

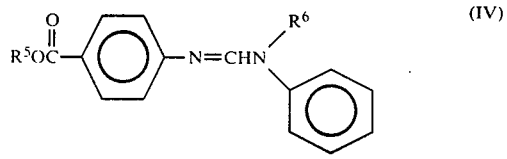

wherein $R^5$ and $R^6$ are identical or different and each represents an alkyl group having 1 to 10 carbon atoms.

$R^5$ and $R^6$ in formula (IV) may be linear or branched, and include, for example, methyl, ethyl, n-propyl, iso-propyl, n-butyl, iso-butyl, sec-butyl, pentyl, hexyl, octyl, nonyl and decyl.

Specific examples of the compounds represented by general formula (IV) include

N-(p-methoxycarbonylphenyl)-N'-methyl-N'-phenylformamidine,

N-(p-methoxycarbonylphenyl)-N'-pentyl-N'-phenylformamidine,

N-(p-methoxycarbonylphenyl)-N'-decyl-N'-phenylformamidine,

N-(p-ethoxycarbonylphenyl)-N'-ethyl-N'-phenylformamidine,

N-(p-ethoxycarbonylphenyl)-N'-hexyl-N'-phenylformamidine,

N-(p-ethoxycarbonylphenyl)-N'-decyl-N'-phenylformamidine,

N-(p-pentoxycarbonylphenyl)-N'-methyl-N'-phenylformamidine,

N-(p-pentoxycarbonylphenyl)-N'-butyl-N'-phenylformamidine,

N-(p-decyloxycarbonylphenyl)-N'-methyl-N'-phenylformamidine,

N-(p-decyloxycarbonylphenyl)-N'-pentyl-N'-phenylformamidine, and

N-(p-decyloxycarbonylphenyl)-N'-decyl-N'-phenylformamidine.

The compound of formula (IV) is produced, for example, by the method described in J. A. Virgilio and E. Heilweil, Org. Prep. Proced. Int., volume 10, No. 2, pages 97 to 100 (1978). A specific method comprises reacting a compound of the following formula

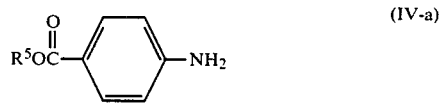

wherein $R^5$ is as defined above, with a compound of the formula

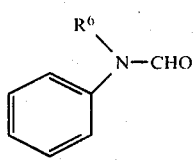

(IV-b)

wherein R[6] is as defined above, under reflux.

The weight ratio of the polyphenylene ether resin (A) to the vinyl aromatic resin (B) in the resin composition of this invention is desirably from 95:5 to 5:95, preferably from 85:15 to 15:85.

The proportion of the phenylformamidine derivative (C) is desirably 0.05 to 10 parts by weight, preferably 0.1 to 5 parts by weight, per 100 parts by weight of the polyphenylene ether resin (A) and the vinyl aromatic resin (B) combined. If the proportion of the phenylformamidine derivative (C) is less than 0.05 part by weight, there is little or no appreciable contribution of the phenylformamidine derivative to an improvement in heat stability. If it is used in an amount exceeding 10 parts by weight, no further improvement in heat stability corresponding to an increase in amount can be expected, and the inherent characteristic properties of the resin composition will be impaired undesirably.

An elastomer component may also be incorporated in the resin composition of this invention in addition to the aforesaid resin components. The elastomer, as used herein, is an elastomer in an ordinary sense of the word. For example, the definition used at pages 71 to 78 of A. V. Tobolsky, "Properties and Structures of Polymers" (John Wiley & Sons, Inc., 1960) can be cited, and the elastomer means a polymer having a Young's modulus at ordinary temperature of $10^5$ to $10^9$ dynes/cm$^2$ (0.1 to 1020 kg/cm$^2$). Specific examples of the elastomer include an A-B-A' type elastomeric block copolymer, a A-B'-A' type elastomeric block copolymer in which the double bond of the polybutadiene portion is hydrogenated, polybutadiene, polyisoprene, a copolymer of a diene compound and a vinyl aromatic compound, nitrile rubber, an ethylene/propylene copolymer, an ethylene/propylene/diene copolymer (EPDM), thiokol rubber, polysulfide rubber, acrylic rubber, polyurethane rubber, a grafted polymer of butyl rubber and polyethylene, and a polyester elastomer. Among these elastomers, the A-B-A' type elastomeric block copolymer is preferred. The terminal blocks A and A' of this block copolymer are blocks of polymerized vinyl aromatic hydrocarbons, and B is a block of a polymerized conjugated diene. Desirably, the molecular weight of the block B is larger than the total molecular weight of the blocks A and A'. The terminal blocks A and A' may be identical or different. These blocks are a thermoplastic homopolymer or copolymer derived from a vinyl aromatic compound whose aromatic moiety is monocyclic or polycyclic. Examples of such a vinyl aromatic compound are styrene, alpha-methylstyrene, vinyltoluene, vinylxylene, ethylvinylxylene, vinylnaphthalene and mixtures of these. The central block B is an elastomeric polymer derived from a conjugated diene-type hydrocarbon such as 1,3-butadiene, 2,3-dimethylbutadiene, isoprene, 1,3-pentadiene or mixtures thereof. The terminal blocks A and A' have a molecular weight of preferably about 2,000 to about 1,000,000, and the central block B has a molecular weight of preferably about 25,000 to about 1,500,000. When the resin composition of this invention further contains the elastomer in addition to the polyphenylene ether resin and the vinyl aromatic resin, the proportion of the polyphenylene ether is usually at least 5% based on the total weight of the resin components in the composition although it varies depending upon the purpose for which the resin composition is produced.

The resin composition of this invention may further include various additives or fillers in addition to the above resin components. Examples of the additives or filler include stabilizers such as sterically hindered phenols, organic phosphites, phosphonites, phosphonous acids, cyclic phosphonites, hydrazine derivatives, amine derivatives, carbamate derivatives, thioethers, phosphoric triamide, benzimidazole derivatives and metal sulfides; ultraviolet absorbers such as benzotriazole derivatives, benzopheone derivatives, salicylate derivatives, sterically hindered amines, oxalic diamide derivatives and organic nickel complexes; polyolefin waxes as lubricants typified by polyethylene ad polypropylene waxes; phosphate-type fire-retarding plasticizers typified by triphenyl phosphate, tricresyl phosphate, cresyldiphenyl phosphate, a phosphate prepared from a mixture of isopropylphenol and phenol, and a dimer of cresyldiphenyl; bromine-type fire retardants typified by decabromobiphenyl, decabromobiphenyl ether, pentabromotoluene, brominated bisphenol A, brominated polystyrene, a polycarbonate oligomer produced by using brominated bisphenol A, and a brominated polyphenylene ether oligomer; pigments typified by titanium dioxide, zinc oxide and carbon black; inorganic fillers typified by glass fibers, glass beads, asbestos, wollastonite, mica, talc, clay, calcium carbonate and silica; metal flakes typified by flakes of copper, nickel, aluminum and zinc; metal fibers typified by aluminum fibers, aluminum alloy fibers, brass fibers and stainless steel fibers; and organic fillers typified by carbon fibers and aromatic polyamide fibers. The amounts of these additional components vary depending upon the kinds of the substances used or the purposes for which they are added.

The polyphenylene ether resin composition of this invention may be prepared by a conventional method. For example, the individual components are mixed by a blender such as a turnable mixer or a Henschel mixer and then kneaded by an extruder, a Banbury mixer, a roll, etc.

The following examples illustrate the resin composition of this invention more specifically. All parts and percentages of the components of the resin compositions in these examples are by weight unless otherwise specified.

EXAMPLE 1 AND COMPARATIVE EXAMPLE 1

Sixty parts of a 2,6-dimethylphenol/2,3,6-trimethylphenol copolymer (the proportion of 2,3,6-trimethylphenol was 5 mole%) having an inherent viscosity, measured at 25° C. using chloroform as a solvent, of 0.52 dl/g, 37 parts of high impact polystyrene (the inherent viscosity of the polystyrene matrix measured at 25° C. using chloroform as a solvent 0.89 dl/g; gel content analyzed by using a mixture of methyl ethyl ketone and acetone as a solvent 12.9% by weight), 2 parts of polystyrene/polybutadiene/polystyrene block copolymer (the weight ratio of the polystyrene to the polybutadiene segment 30:70; the viscosity of the copolymer as a 20% toluene solution measured at 25° C. by a Brookfield Model RVT viscometer 1,500 cps), 1 part of an ethylene/propylene copolymer (reduced specific viscosity measured at 135° C. in decalin as solvent in a concentration of 0.1 g/100 ml 2.0; glass transition point −49° C.), 5.8 parts of triphenyl phosphate, 7 parts of titanium oxide and 1 part of N-(p-ethoxycarbonylphenyl)-N'-ethyl-N'-phenylformamidine ("Givsorb UV-2" manufactured by Givaudan Corp.) were fully mixed in a Henschel mixer.

The mixture was pelletized by extrusion from a twin-screw extruder (Model AS-30 made by Nakatani Machinery Co.) whose cylinder was set at a maximum temperature of 290° C. The pellets were then molded under an injection pressure of 1,050 kg/cm² into a test specimen for measuring Izod impact strength (thickness ⅛ inch) by an injection molding machine (Model SJ-35B made by Meiki Co., Ltd.) whose cylinder was set at a maximum temperature of 280° C. The test specimen was aged in hot air at 115° C. for 10 days. The notched Izod impact strength of the test specimen before and after hot air aging was measured. The results are shown in Table 1.

For comparison, the above operation was repeated except that the phenylformamidine derivative was not used. The notched Izod impact strength of the test specimen in this case is also shown in Table 1.

TABLE 1

| | Notched Izod impact strength (kg-cm/cm) | |
|---|---|---|
| | Before aging | After aging |
| Example 1 | 17.0 | 11.2 (66%) |
| Comparative Example 1 | 18.8 | 10.3 (55%) |

The figures shown in the parentheses in percent show percent retentions. The retention is calculated in accordance with the following equation.

$$\text{Retention (\%)} = \frac{\text{Value after the heat aging}}{\text{Value before the heat aging}} \times 100$$

In the tables given hereinbelow, the retentions are the same as this definition.

It is clear from the Izod impact strengths shown in Table 1 that the use of N-(p-ethoxycarbonylphenyl)-N'-ethyl-N'-phenylformamidine suppressed the decrease of the Izod impact strength attributed to aging.

EXAMPLE 2

Example 1 was repeated except that the N-(p-ethoxycarbonylphenyl)-N'-ethyl-N'-phenylformamidine was used in an amount of 2 parts. The results are shown in Table 2.

TABLE 2

| | Notched Izod impact strength (kg-cm/cm) | |
|---|---|---|
| | Before aging | After aging |
| Example 2 | 17.6 | 12.8 (73%) |

EXAMPLE 3

Example 1 was repeated except that 1 part of N-(p-pentoxycarbonylphenyl)-N'-ethyl-N'-phenylformamidine was used instead of the N-(p-ethoxycarbonylphenyl)-N'-ethyl-N'-phenylformamidine. The results are shown in Table 3.

TABLE 3

| | Notched Izod impact strength (kg-cm/cm) | |
|---|---|---|
| | Before aging | After aging |
| Example 3 | 18.1 | 11.2 (62%) |

EXAMPLE 4

Example 1 was repeated except that 1 part of N-(p-ethoxycarbonylphenyl)-N'-hexyl-N'-phenylformamidine was used instead of the N-(p-ethoxycaerbonylphenyl)-N'-ethyl-N'-phenylformamidine. The results are shown in Table 4.

TABLE 4

| | Notched Izod impact strength (kg-cm/cm) | |
|---|---|---|
| | Before aging | After aging |
| Example 4 | 20.2 | 12.1 (60%) |

EXAMPLE 5

Example 1 was repeated except that 0.4 part of tetrakis-(2,4-di-tert-butylphenyl)-4,4'-biphenylene diphosphonite and 0.6 part of 2,2'-methylene-bis(4-methyl-6-tert-butylphenol) were further added. The results are shown in Table 5.

TABLE 5

| | Notched Izod impact strength (kg-cm/cm) | |
|---|---|---|
| | Before aging | After aging |
| Example 5 | 19.1 | 14.7 (77%) |

EXAMPLE 6 AND COMPARATIVE EXAMPLE 2

Forty-two parts of poly(2,6-dimethyl-1,4-phenylene)ether having an inherent viscosity, measured at 25° C. in chloroform, of 0.50 dl/g, 58 parts of the same high-impact polystyrene as used in Example 1, 7 parts of the same titanium dioxide as used in Example 1 and 0.5 part of N-(p-ethoxycarbonylphenyl)-N'-ethyl-N'-phenylformamidine were mixed and molded in the same way as in Example 1 to form a test specimen.

The above procedure was repeated except that the formamidine derivative was not used.

The results are shown in Table 6.

TABLE 6

| | Notched Izod impact strength (kg-cm/cm) | |
|---|---|---|
| | Before aging | After aging |
| Example 6 | 11.4 | 6.6 (58%) |
| Comparative Example 2 | 10.9 | 5.4 (50%) |

What is claimed is:

1. A polyphenylene ether resin composition comprising
   (A) a polyphenylene ether resin,
   (B) a vinyl aromatic resin, and
   (C) a heat stabilizing amount of a phenylformamidine derivative of the formula

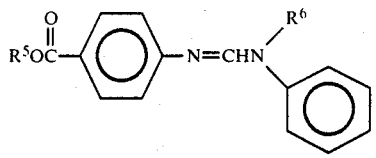
(IV)

wherein $R^5$ and $R^6$, independently from each other, represent an alkyl group having 1 to 10 carbon atoms.

2. The polyphenylene ether resin composition of claim 1 wherein the polyphenylene ether resin is a homopolymer or a copolymer of a monocyclic phenol represented by the following formula

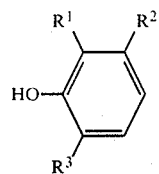
(I)

wherein $R^1$ represents an alkyl group having 1 to 3 carbon atoms, and $R^2$ and $R^3$, independently from each other, represent a hydrogen atom or an alkyl group having 1 to 3 carbon atoms.

3. The polyphenylene ether resin composition of claim 1 wherein the vinyl aromatic resin is a resin containing at least 25% by weight of recurring structural units represented by the following general formula

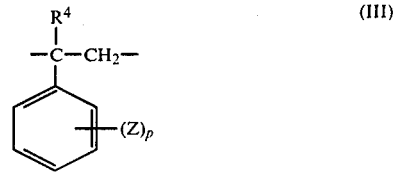
(III)

wherein $R^4$ represents a hydrogen atom or a lower alkyl group, Z represents a halogen atom or a lower alkyl group, and p is zero or a positive integer of 1 to 3.

4. The polyphenylene ether resin composition of claim 1 wherein the weight ratio of the polyphenylene ether resin to the vinyl aromatic resin is from 95:5 to 5:95.

5. The polyphenylene ether resin composition of claim 1 wherein the phenylformamidine derivative is contained in an amount of 0.05 to 10 parts by weight per 100 parts by weight of the polyphenylene ether resin and the vinyl aromatic resin combined.

* * * * *